United States Patent
Hernandez

(10) Patent No.: US 11,055,336 B1
(45) Date of Patent: *Jul. 6, 2021

(54) SPEECH RECOGNITION FOR PROVIDING ASSISTANCE DURING CUSTOMER INTERACTION

(71) Applicant: State Farm Mutual Automobile Insurance Company, Bloomington, IL (US)

(72) Inventor: Sylvia Hernandez, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/294,316

(22) Filed: Mar. 6, 2019

Related U.S. Application Data

(63) Continuation of application No. 15/091,302, filed on Apr. 5, 2016, now Pat. No. 10,275,522.

(Continued)

(51) Int. Cl.
*G06F 17/00* (2019.01)
*G06F 16/35* (2019.01)
(Continued)

(52) U.S. Cl.
CPC ........ *G06F 16/353* (2019.01); *G06F 16/3329* (2019.01); *G06F 16/3344* (2019.01); *G06Q 30/016* (2013.01); *G06Q 40/08* (2013.01)

(58) Field of Classification Search
CPC ............... G06F 16/353; G06F 16/3344; G06F 16/3329; G06Q 30/016; G06Q 40/08
See application file for complete search history.

(56) References Cited

U.S. PATENT DOCUMENTS 6,275,806 B1 8/2001 Pertrushin
6,678,694 B1 1/2004 Zimmermann
(Continued)

OTHER PUBLICATIONS

Y. Yang and L. Li, "The Design and Implementation of a Smart e-Receptionist," in IEEE Potentials, vol. 32, No. 4, pp. 22-27, doi: 10.1109/MPOT.2012.2213851., Jul. 22, 2013.*

(Continued)

*Primary Examiner* — Greta L Robinson

(57) ABSTRACT

A computer-implemented method for presenting relevant information to a customer service representative of a business may include receiving a digitized data stream corresponding to a spoken conversation between a customer and a representative; converting the data stream to a text stream; determining one or more keywords from the text stream; comparing the one or more keywords with a history of keywords that have previously been searched; and/or searching a database for information related to the one or more keywords that have not been previously searched. As a result of the keyword search, information about topics that the customer is interested in, may be located and displayed on a customer service representative display to facilitate the customer service representative timely relaying the information found by the keyword search to enhance the customer experience. Exemplary keywords may relate to insurance and financial services, such as "auto," "home," "life," "insurance," or "vehicle loan."

20 Claims, 4 Drawing Sheets

Related U.S. Application Data

(60) Provisional application No. 62/174,352, filed on Jun. 11, 2015.

(51) Int. Cl.
  *G06F 16/33* (2019.01)
  *G06F 16/332* (2019.01)
  *G06Q 40/08* (2012.01)
  *G06Q 30/00* (2012.01)

(56) References Cited

U.S. PATENT DOCUMENTS

| | | | |
|---|---|---|---|
| 7,058,565 B2 | 6/2006 | Gusler et al. | |
| 7,133,828 B2 | 11/2006 | Scarano et al. | |
| 7,263,489 B2 | 8/2007 | Cohen et al. | |
| 7,487,094 B1 | 2/2009 | Konig et al. | |
| 7,672,845 B2 | 3/2010 | Beranek et al. | |
| 7,761,321 B2 | 7/2010 | Kannan et al. | |
| 7,844,466 B2 | 11/2010 | Roy | |
| 8,010,391 B2 * | 8/2011 | Wait | G06Q 40/08 705/4 |
| 8,204,884 B2 | 6/2012 | Freedman et al. | |
| 8,224,840 B2 | 7/2012 | Bao | |
| 8,775,514 B2 | 7/2014 | Goel | |
| 8,837,687 B2 | 9/2014 | Odinak et al. | |
| 8,892,419 B2 | 11/2014 | Lundberg et al. | |
| 8,971,217 B2 | 3/2015 | Smith, Jr. | |
| 9,026,551 B2 | 5/2015 | Drennan, III | |
| 9,118,751 B2 | 8/2015 | Kolbegger et al. | |
| 9,386,152 B2 | 7/2016 | Riahi et al. | |
| 9,392,117 B2 | 7/2016 | Milstein et al. | |
| 9,412,130 B2 | 8/2016 | Wasserman et al. | |
| 9,413,891 B2 | 8/2016 | Dwyer et al. | |
| 9,460,722 B2 | 10/2016 | Sidi et al. | |
| 9,536,266 B2 | 1/2017 | Ploesser et al. | |
| 9,635,178 B2 | 4/2017 | Raanani et al. | |
| 9,661,067 B2 | 5/2017 | Seth et al. | |
| 9,799,035 B2 | 10/2017 | Cama et al. | |
| 10,147,427 B1 | 12/2018 | Johnson et al. | |
| 10,275,522 B1 | 4/2019 | Hernandez | |
| 10,417,643 B2 | 9/2019 | Sri et al. | |
| 2003/0078766 A1 * | 4/2003 | Appelt | G06F 16/3344 704/9 |
| 2003/0125958 A1 | 7/2003 | Alpdemir | |
| 2004/0008828 A1 | 1/2004 | Coles et al. | |
| 2007/0033005 A1 | 2/2007 | Cristo | |
| 2009/0327263 A1 | 12/2009 | Maghoul | |
| 2011/0106534 A1 | 5/2011 | LeBeau | |
| 2012/0197644 A1 | 8/2012 | Nagano et al. | |
| 2013/0030807 A1 * | 1/2013 | Burns | G10L 15/30 704/235 |
| 2013/0266127 A1 | 10/2013 | Schachter et al. | |
| 2013/0301815 A1 | 11/2013 | Berger | |
| 2013/0315385 A1 | 11/2013 | Zhao et al. | |
| 2014/0172740 A1 * | 6/2014 | McCormick | G06Q 30/0281 705/342 |
| 2014/0324481 A1 * | 10/2014 | Schoos | G06Q 50/01 705/4 |
| 2017/0078490 A1 | 3/2017 | Kaminsky | |

OTHER PUBLICATIONS

Z. Kacic, "Advances in spoken dialogue systems development," ISIE '99. Proceedings of the IEEE International Symposium on Industrial Electronics (Cat. No. 99TH8465), Bled, Slovenia, pp. 169-172 vol. 1, doi: 10.1109/ISIE.1999.801778, Jul. 1999.*

Habibi, Maryann, et al., "Keyword Extraction and Clustering for Document Recommendation in Conversations," IEEE, (2013); retrieved from the Internet at http://publications.idiap.ch/downloads/papers/2016/Habibi_IEEEACMTASLP_2014; 14 pages.

Fernandez, Santiago, et al., "An application of recurrent neural networks to discriminative keyword spotting," International Conference on Artificial Neural, Networks, (date unknown), retrieved from the Internet at https://mediatum.ub.tum.de/doc/1289941/file.pdf; 10 pages.

Bae, Sung Min, et al., "A web-based system for analyzing the voices of call center customers in the service industry," Elsevier Expert Systems with Applications 28 (2005) 29-41, retrieved from the Internet at https://cmapspublic3.ihmc.us/rid=1MT7F5224-XVH7BJ-1535/Bae%2005%20ESwAJ%20webbased%20system%20for%20analyzing%20the%20voices%20of%20call%20center%20customer.pdf; 13 pages.

Ezzat, Souraya, et al., "Sentiment Analysis of Call Centre Audio Conversations using Text Classification," International Journal of Computer Information Systems and Industrial Management Applications, ISSN 2150-7988 vol. 4 (2012), retrieved from the Internet at http://www.mirlabs.net/ijcisim/regular_papers_2012/Paper68.pdf; 9 pages.

Gupta, Purnima, et al., "Two-Stream Emotion Recognition for Call Center Monitoring," InterSpeech Aug. 27-31, 2007, Antwerp, Belgium, retrieved from the Internet at http://citeseerx.ist.psu.edu/viewdoc/download?doi=10.1.1.348.4882&rep=rep1&type=pdf; 4 pages.

Pallotta, Vincenzo, et al., "Interaction Mining: The New Frontier of Customer Interaction Analytics," Studies in Computational Intelligence • Jan. 2013, retrieved from the Internet at https://www.researchgate.net/profile/Vincenzo_Pallotta/publication/289733213_Interaction_Mining_The_New_Frontier_of_Customer_Interaction_Analytics/links/5735a9d308ae9ace840ac79c.pdf. Publication date via https://link.springer.com/chapter/10.1007/978-3-642-31546-6_6; 22 pages.

Weng, Chao, et al., "Discriminative Training Using Non-uniform Criteria for Keyword Spotting on Spontaneous Speech," IEEE/ACM Transactions on Audio, Speech, and Language Processing 23, No. 2, retrieved from the Internet at https://sites.google.com/site/cweng6/files-1/manuscript.pdf; 4 pages.

* cited by examiner

SPEECH RECOGNITION FOR PROVIDING ASSISTANCE DURING CUSTOMER INTERACTION

RELATED APPLICATIONS

The current patent application is a continuation of, and claims the benefit of, U.S. patent application Ser. No. 15/091,302, filed Apr. 5, 2016 and entitled "VOICE AND SPEECH RECOGNITION FOR CALL CENTER FEEDBACK AND QUALITY ASSURANCE," which claims priority benefit with regard to all common subject matter to U.S. Provisional Application Ser. No. 62/174,352, titled "SPEECH RECOGNITION FOR PROVIDING ASSISTANCE DURING CUSTOMER INTERACTION," filed Jun. 11, 2015. The listed earlier-filed provisional application is hereby incorporated by reference in its entirety into the current patent application.

FIELD OF THE INVENTION

The present disclosure generally relates to computing devices, software applications, and methods that utilize speech recognition to assist a customer service representative in finding relevant information during a customer service phone call.

BACKGROUND

Businesses often receive phone calls from potential customers wishing to get information regarding products or services offered by the business. For example, the potential customer may want to know about features and pricing of a particular product. In addition, current customers may call wishing to change a service or get technical support about a particular product. Given that a business may offer numerous services or have numerous products in numerous product lines, a customer representative fielding the phone call may have difficulty in being able to provide accurate and detailed information about any one service or product. While the customer representative may have access to a computing device or computer terminal on which he or she can search for relevant information during the phone call, the process of searching may require time during which the customer has to wait for the representative to type in appropriate keywords or search strings in response to the customer's queries. This may lead to inefficient usage of both the customer's time and the representative's time, and negatively impact the customer experience.

BRIEF SUMMARY

Embodiments of the present technology relate to computing devices, software applications, computer-implemented methods, and computer-readable media for presenting relevant information to a customer service representative of a business. The embodiments provide for receiving a data stream corresponding to a spoken conversation between a customer and a representative, converting the data stream to a text stream, determining keywords from the text stream, and searching a database for information related to the keywords.

In a first aspect, a computer-implemented method for presenting relevant information to a customer service representative of a business may be provided. The method may include: (1) receiving a digitized data stream corresponding to a spoken conversation between a customer and a representative; (2) converting the data stream to a text stream; (3) determining one or more keywords from the text stream; (4) comparing the one or more keywords with a history of keywords that have previously been searched; and/or (5) searching a database for information related to the one or more keywords that have not been previously searched. The information yielded by the keyword search may be presented on a display for the customer service representative's review. After which, the customer service representative may relay the information to the customer in a timely manner and the customer experience may be enhanced. The method may include additional, fewer, or alternative actions, including those discussed elsewhere herein and/or may be implemented via one or more local or remote processors or servers, and/or computer-executable instructions stored on non-transitory computer-readable media or medium.

In another aspect, a computing device for presenting relevant information to a customer service representative of a business may be provided. The computing device may include a processing element electronically coupled to a memory element and configured to receive a digitized data stream corresponding to a spoken conversation between a customer and a representative, convert the data stream to a text stream, determine one or more keywords from the text stream, compare the one or more keywords with a history of keywords that have previously been searched, and search a database for information related to the one or more keywords that have not been previously searched to facilitate the representative relaying relevant information to the customer and/or enhancing the customer experience. The computing device may include additional, fewer, or alternate components and/or functionality, including that discussed elsewhere herein.

In yet another aspect, a software application presenting relevant information to a customer service representative of a business, such as during a telephone with a customer, may be provided. The software application may comprise a speech recognition component, a keyword generator, and/or a search engine. The speech recognition component may receive a data stream corresponding to a conversation between a representative and a customer, and may be configured to convert the data stream to a text stream of words from the conversation. The keyword generator may receive the text stream, and may be configured to generate one or more keywords from the text stream. The search engine may receive the one or more keywords, and may be configured to compare the one or more keywords with a history of keywords that have previously been searched and search a database for (relevant) information related to the one or more keywords that have not been previously searched to facilitate the representative relaying relevant information to the customer and/or enhancing the customer experience. The software application may include additional, less, or alternate functionality, including that discussed elsewhere herein.

In yet another aspect, a computer-readable medium for presenting relevant information to a customer service representative of a business may be provided. The computer-readable medium may include an executable program stored thereon, wherein the program instructs a processing element of a computing device to perform the following steps: (1) receiving a digitized data stream corresponding to a spoken conversation between a customer and a representative; (2) converting the data stream to a text stream; (3) determining one or more keywords from the text stream; (4) comparing the one or more keywords with a history of keywords that have previously been searched; (5) and/or searching a database for information related to the one or more keywords that have not been previously searched to facilitate the representative relaying relevant information to the customer in a timely manner and/or enhancing the customer experience. The program stored on the computer-readable medium may instruct the processing element to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computing devices, software applications, and computer-implemented methods disclosed therein. It should be understood that each Figure depicts an embodiment of a particular aspect of the disclosed devices, applications, and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
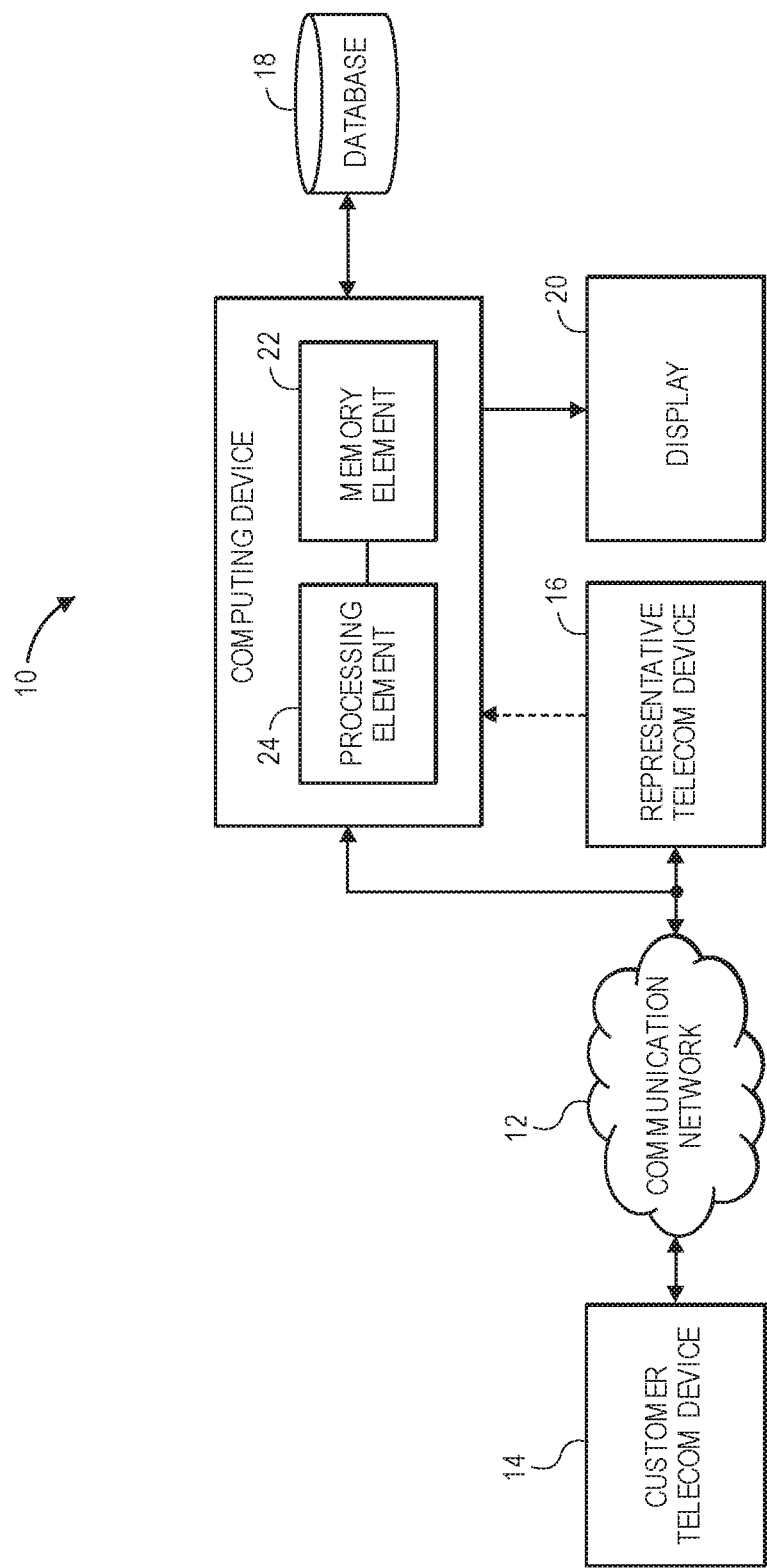
FIG. 1 illustrates an exemplary environment, shown in block schematic form, in which various components of a computing device may be utilized, the computing device configured to present relevant information to a customer service representative of a business.

The Figures depict exemplary embodiments for purposes of illustration only. One skilled in the art will readily recognize from the following discussion that alternative embodiments of the devices, applications, and methods illustrated herein may be employed without departing from the principles of the invention described herein.

DETAILED DESCRIPTION

The present embodiments described in this patent application and other possible embodiments may relate to, inter alia, computing devices, software applications, methods, and media for displaying relevant information to a customer service representative while he is interacting with a customer. The computing device, through hardware operation, execution of the software application, implementation of the method, or combinations thereof, may be utilized as follows.

An existing customer, or a potential customer, may call a business seeking information regarding one or more products or services offered by the business. Alternatively, the customer may call seeking technical support for one of the products. The representative may answer the call with a telecom device, such as a telephone including a headset or a handset. The computing device may also receive the call either through a communication line, such as a phone line, or through a connection with the telecom device. While the customer and the representative are having a conversation, speech recognition may be performed, converting the dialog between the customer and the representative to text.

The text may be parsed and language that may be used as keywords or search strings may be generated. In some embodiments, single words or combinations of words in the text may be compared with a list of acceptable or relevant keywords. For example, if the business is an insurance company, the customer may be calling about insurance products. Thus, the customer may mention words like "homeowner's policy" or "auto insurance" during the conversation. The rest of the conversation may be filtered and just those words may be generated as keywords.

If the currently-generated keywords have not been searched before then, the keywords may be used to search for relevant information in a database or a library of product-related documents. The information may include options and pricing for a product, specifications for the product, operation of the product, definitions of the keywords, and the like. The results of the search may then be presented on a display used by the representative. Each result may be shown in a separate window on the display, with each window configured to scroll to show more information. Alternatively, a list of results may be presented on the display, allowing the representative to select which result he wants to view. The results may also be ranked according to a percent match, or strength, of the content of each result to the keywords used for the search. As an example, the results with a higher percentage match may be placed at the top of the list of results.

The process may continue in real time during the phone conversation, wherein the conversation may be continually converted to text and the text may be parsed for keywords. Because certain keywords may be used numerous times during a conversation, each keyword, or group of keywords, may be compared with a history of keywords that have been previously searched in order to avoid presenting repeated information on the display. If the keyword has not been searched before, then the database is searched for information relevant to the keyword. The search results may be presented on the display, and the keyword just searched may be added to the search history.

Embodiments of the current invention may assist a customer service representative during a phone conversation with a customer by automatically displaying information about the topic of conversation in real time for the representative to view. The current invention alleviates the need for the representative to type in keywords and search manually for relevant information, thereby allowing the representative to focus more on the conversation with the customer.

Specific embodiments of the technology will now be described in connection with the attached drawing figures. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense.

The scope of the present invention is defined only by the appended claims, along with the full scope of equivalents to which such claims are entitled.

I. Exemplary Computing Device

FIG. 1 depicts an exemplary environment in which embodiments of a computing device 10 may be utilized. The environment may include a communication network 12, a customer telecom device 14, a representative telecom device 16, a database 18, and/or a display 20. The computing device 10 may broadly comprise a memory element 22 and a processing element 24 capable of executing a software application 26. The computing device 10 may present relevant information to a customer service representative of a business while he is interacting with a customer to discuss products or services of the business.

The communication network 12 generally allows communication between the customer telecom device 14 and the representative telecom device 16. The communication network 12 may include local area networks, metro area networks, wide area networks, cloud networks, the Internet, cellular networks, plain old telephone service (POTS) networks, and the like, or combinations thereof. The communication network 12 may be wired, wireless, or combinations thereof and may include components such as modems, gateways, switches, routers, hubs, access points, repeaters, towers, and the like. The telecom devices 14, 16 may connect to the communication network 12 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The customer telecom device 14 generally allows the customer to communicate with the representative of the business. The customer telecom device 14 may be embodied by a cell phone, a mobile phone, a smart phone, a landline, or any phone capable of sending and receiving voice communication through the communication network 12. The customer telecom device 14 may include electronic circuitry to send and receive voice communication either wirelessly or through wires or cables. The customer telecom device 14 may further include user interface components such as a keypad, a speaker and a microphone incorporated in a headset or handset, and the like. The customer may utilize the customer telecom device 14 in a conventional manner.

The representative telecom device 16 generally allows the representative to communicate with the customer. The representative telecom device 16 may be typically embodied by a landline type of phone including a base station and a headset with a microphone and a speaker, although other types of phones, such as a smart phone, may be utilized. The representative telecom device 16 may function in a substantially similar fashion to the customer telecom device 14 such that the representative telecom device 16 may communicate with the customer telecom device 14 through the communication network 12 to allow the representative to have a conversation with the customer.

The database 18 generally stores product-related documents and other information relevant to the business. The database 18 may have a traditional database structure including fields, keys, arrays, tables, linked lists, and the like with a database manager to provide or control access to the data. The database 18 may include account information for a current customer. The database 18 may additionally or alternatively include a collection or library of documents or articles which may be searched. Furthermore, the database 18 may include data that is accessible via the Internet. The database 18 may be stored in the memory element 22 of the computing device 10, on one or more servers that are accessible by the computing device 10, or combinations thereof.

The display 20 generally presents information to the representative. The display 20 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 20 may include a screen on which the information is presented, with the screen possessing a square or a rectangular aspect ratio that may be viewed in either a landscape or a portrait mode. In various embodiments, the display 20 may also include a touch screen occupying the entire screen or a portion thereof so that the display 20 functions as part of a user interface. In some embodiments, the display 20 may be housed in a monitor housing or the like. In other embodiments, the display 20 may be integrated with the computing device 10.

The memory element 22 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element 24. The memory element 22 may include, or may constitute, a "computer-readable medium." The memory element 22 may store the instructions, code, code segments, software, firmware, programs, applications, apps, services, daemons, or the like, including the software application 26, that are executed by the processing element 24. In some embodiments, the memory element 22 may also store some or all of the database 18.

The processing element 24 may include processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, software, firmware, programs, applications, apps, processes, services, daemons, or the like. The processing element 24 may also include hardware components such as finite-state machines, sequential and combinational logic, and other electronic circuits that may perform the functions necessary for the operation of the current invention. The processing element 24 may further include, or be in electronic communication with, circuitry to decode or convert wireless signals, as well as sampling circuits, analog to digital converters (ADCs), filtering circuits, amplifier circuits, and the like. The processing element 24 may be in communication with the other electronic components through serial or parallel links that include address busses, data busses, control lines, and the like.

By executing the software application 26 or through the use of specially-configured hardware, the processing element 24 may perform the following tasks. The processing element 24 may receive an audio stream from either the communication network 12 or the representative telecom device 16. The audio stream is typically digitized by the customer telecom device 14, the representative telecom device 16, or the computing device 10 to create a data stream. The audio stream or the data stream may also be filtered to eliminate noise and frequencies outside of the typical human vocal range. The processing element 24 may implement speech recognition or may convert speech to text utilizing techniques such as hidden Markov models, dynamic time warping, neural networking, or the like, or combinations thereof. The output of the speech recognition may be a stream of text words that provide a transcript of the conversation—converting the speech of both the customer and the representative.

The processing element 24 may parse the stream of text and determine words from the conversation that may be used as keywords or search strings for a search of the database 18. If the text includes words that might identify the customer, such as "name", "address", "phone number", "account number", "policy number", and the like, then the processing element 24 may determine that whatever names, letters, or numbers following any of those terms is the search string. Otherwise, the processing element 24 may compare single words or combinations of words in the text with a list of acceptable or relevant keywords. As an example, if the business is an insurance company, the customer may be calling about insurance products. Thus, the list of acceptable or relevant keywords may include words like "homeowner's policy" or "auto insurance." The processing element 24 may filter the text of the rest of the conversation and generate just those words as keywords. In addition or instead, other algorithms or rules may be applied in determining the keywords.

Once the keywords are generated, the processing element 24 may compare the currently-generated keywords with a history of keywords that have been previously searched. If the currently-generated keywords have been searched already, then there is no point to perform a search, so the processing element 24 may continue converting the speech to text and generating keywords from the text. If the currently-generated keywords have not been searched, then the processing element 24 continues with the search described below. The search history may be purged at the beginning or the end of each conversation.

The processing element 24 may utilize the keywords to search for relevant information in the database 18. If any of the customer identification search strings are found in the text, then the processing element 24 may search for those in the database. The search results may include the customer's account information or records, such as the types of policies held by the customer along with features of the policies, in the example of the business being an insurance company. The search may also return articles or information windows based upon the requests of the customer. For example, if the customer asks about saving money on their policy, then the search may also return information about insurance discounts, with titles such as "Deductible Option Pros and Cons," "Discount programs," "Multi-Line Discounts," "Options and Endorsements for HO-W policies." In addition to the search results, the processing element 24 may also provide prompts for the representative to present to the customer, such as asking the customer questions about changes or additions to their policy that would save money. If the customer is a potentially new customer, then the processing element 24 may not search on any of the customer identification search strings. Or, it is possible that the processing element 24 may search the database 18 for the name spoken by the customer and may determine that the name is not in the database. Instead or in addition, the processing element 24 may search the database 18 for information regarding whatever product is mentioned by the customer that matches one or more of the keywords. The results of any search along with any prompts may be communicated to the display 20.

In some embodiments, all of the search results may be communicated to the display 20 to be shown on the screen simultaneously with each result being shown in a separate window. Any prompt may be shown in a separate window as well. For a current customer, the details of each policy along with information and prompts about discounts may be shown in a separate window. For a potentially new customer, information about premium rates may be shown along with information about having multiple policies, relevant requirements or laws, or the like. In other embodiments, a portion of each search result may be shown on the display 20 in a list format, wherein the representative may choose which results he would like to see. The processing element 24 may rank or rate the search results based upon relevance to the keywords. For example, the processing element 24 may assign a percentage match value to each result and may present the percentage value with its associated result. Those results with a higher percentage match may be presented at the top of the list. In addition, the processing element 24 may store the keywords that were just searched in the search history in the memory element 22.

The computing device 10 may operate as follows. The computing device 10 may be electronically coupled to the communication network 12 or to the representative telecom device 16 in order to receive the electronic signal of the conversation between the representative and the customer. In some embodiments, the computing device 10 may be integrated with the representative telecom device 16. When a customer calls a representative, the computing device 10 may receive the call as well. The representative may try to establish whether the customer is an existing customer or a potentially new customer. If the customer is an existing customer, then the representative may ask the customer for a name associated with the account, an address, a telephone number, an account number, a policy number, or the like. When the customer responds, the computing device 10 may receive the speech from the customer and may convert the speech to text. The computing device 10 may also isolate the string, such as the name, the address, etc., to identify the customer and may use the string to search the database 18. The computing device 10 may communicate the customer's account information to the display 20. If the customer has multiple insurance policies, then the details of each policy may be presented on the display 20 on a separate window.

If the customer is not an existing customer, then, while the computing device 10 may receive the speech from the customer and convert the speech to text, the computing device 10 may not search the database 18 for customer account information, because none of the search strings for a customer will be received from the customer. Or, the computing device 10 may search the database 18 for the customer's name and determine that the customer is not an existing customer.

After the computing device 10 presents customer account information on the display 20 or determines that the customer is a potential new customer, the computing device 10 may continue to monitor the conversation, converting the speech to text (from both the customer and the representative), determining any product-related keywords from the text, searching the database 18 for information on the keywords, and presenting the results from the search to the representative on the display 20. However, before performing any search, the computing device 10 may determine whether the search has been performed previously. If not, then the computing device 10 performs the search. If so, then the search is skipped. In some embodiments, each result may be presented in its own window, while in other embodiments, the results may be presented in a ranked list from which the representative may select the result he would like to view. For each keyword or group of keywords spoken by either the customer or the representative, the computing device 10 may search for related information and present the search results to the representative.

II. Exemplary Computer-Implemented Method

Figure 2:
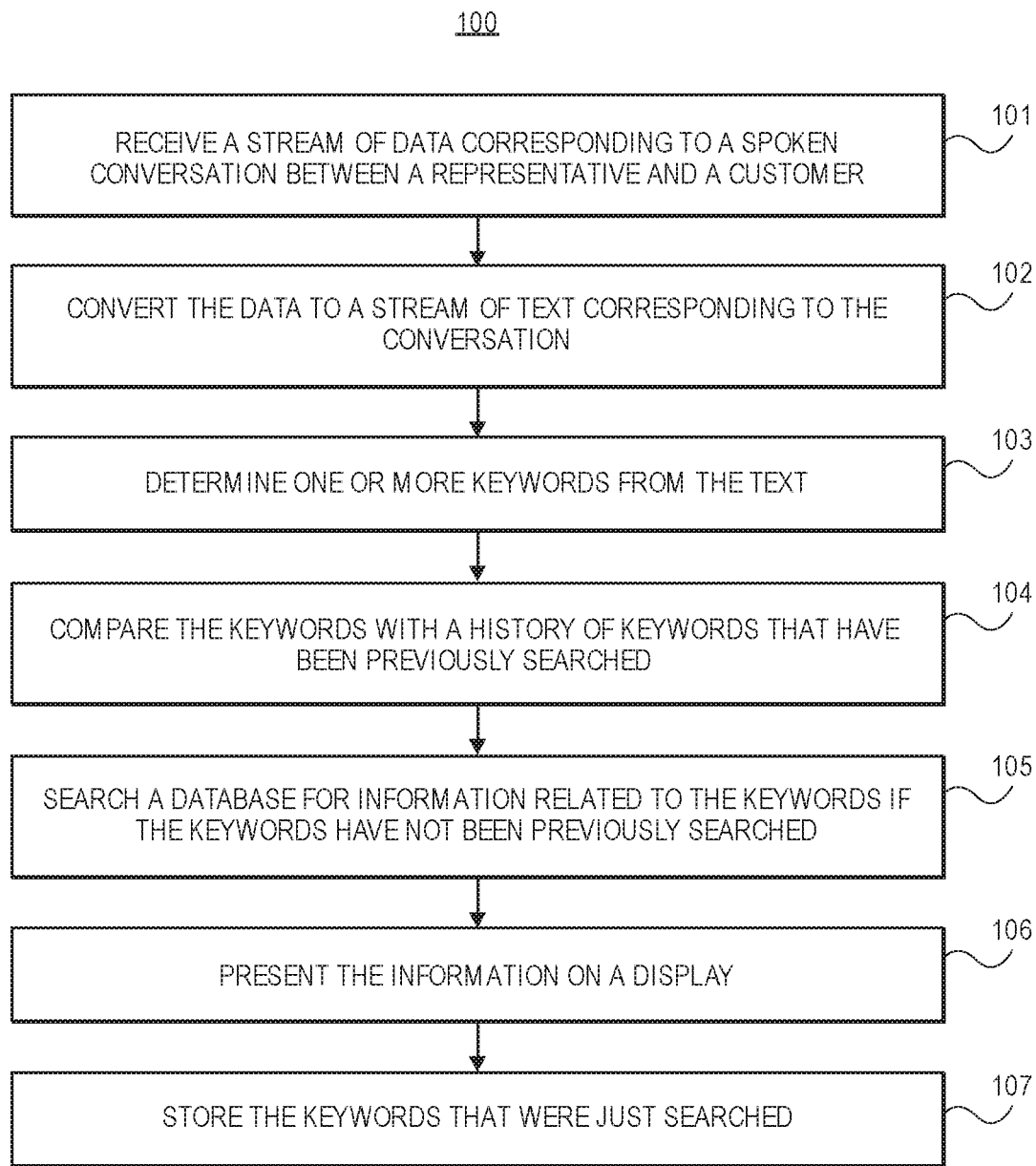
FIG. 2 illustrates at least a portion of the steps of an exemplary computer-implemented method for presenting relevant information to a customer service representative of a business.

FIG. 2 depicts a listing of steps of an exemplary computer-implemented method 100 for presenting relevant information to a customer service representative of a business while he or she is interacting with a customer to discuss products or services of the business. The steps may be performed in the order shown in FIG. 2, or they may be performed in a different order. Furthermore, some steps may be performed concurrently as opposed to sequentially. In addition, some steps may be optional. The steps of the computer-implemented method 100 may be performed by the computing device 10 or may be incorporated in the software application 26.

Referring to step 101, a stream of data corresponding to a spoken conversation between a representative and a customer is received. The stream of data may be received from a communication network 12 or a telecom device 14, 16 and may be digitized and filtered.

Referring to step 102, the stream of data may be converted to a stream of text corresponding to the conversation. Speech recognition or speech conversion techniques such as hidden Markov models, dynamic time warping, neural networking, or the like, or combinations thereof may be utilized in order to convert the data stream to text.

Referring to step 103, one or more keywords may be determined from the text. The keywords may include customer identification data and/or words that are related to products or services offered by the business. For example, if the text includes the customer's name, such as "John Smith", then the keywords "name: john smith", or words with a similar syntax and format, may be generated. The text may also include the customer mentioning identification data such as an address, a phone number, an account number, a policy number, or the like. Accordingly, words and alphanumerics, such as "phone number: 123456789" or the like, may be generated as keywords. As another example, during the conversation, the text may include words related to the products of the business. In some embodiments, words, or groups of words, in the text may be compared with a list of product-related keywords. Those words in the text that match the keywords in the list may then be output as keywords. For instance, if the business is an insurance company, then the customer and/or the representative may mention words such as "homeowner's policy" or "auto insurance." These words may match keywords in the keyword list, and thus may be generated as keywords. In addition or instead, other algorithms or rules may be applied in determining the keywords.

Referring to step 104, the keywords may be compared with a history of keywords that have been previously searched. A history, list, or database of previously searched keywords may be stored in the memory element 22 of the computing device 10. Keywords generated from step 103 may be compared to this list to see if there is a match. If there is not a match, then the following steps may be performed. If there is a match, then none of the following steps are performed, and steps 101 through 104 may be repeated.

Referring to step 105, a database 18 may be searched for information related to the keywords if there is not a match in the previous step. If any of the customer identification keywords are found in the text, then the database 18 may be searched for those words. The search results may include the customer's account information or records, such as the types of policies held by the customer along with features of the policies, in the example of the business being an insurance company. The search may also return articles or information windows based upon the requests of the customer. For example, if the customer asks about saving money on their policy, then the search may also return information about insurance discounts. In addition to the search results, prompts for the representative to present to the customer may also be provided, such as asking the customer questions about changes or additions to their policy that would save money. If the customer is a potentially new customer, then the customer identification keywords may not be searched since the potential new customer would not have account data for which to search. Or, it is possible that the name spoken by the customer is searched in the database 18 and not found. Instead or in addition, the database 18 may be searched for information regarding whatever product is mentioned by the customer that matches one or more of the keywords—such as auto, home, life, renters, personal articles, burial, pet, and/or other types of insurance.

Referring to step 106, information found in the search is presented on a display 20. In some embodiments, all of the search results may be communicated to the display 20 to be shown on the screen simultaneously with each result being shown in a separate window. Any prompt may be shown in a separate window as well. For a current customer, the details of each policy along with information and prompts about discounts may be shown in a separate window. For a potentially new customer, information about premium rates may be shown along with information about having multiple policies, relevant requirements or laws, or the like. In other embodiments, a portion of each search result may be shown on the display 20 in a list format, wherein the representative may choose which results he would like to see. The search results may be ranked or rated based upon relevance to the keywords. For example, a percentage match value may be assigned to each result and the percentage value may be presented with its associated result. Those results with a higher percentage match may be presented at the top of the list.

Referring to step 107, the keywords that were just searched may be stored in the memory element 22. The keywords may be added to the history, list or database that is referenced in step 104. Once the keywords have been stored, steps 101 through 104, at least, may be performed again in a repeated fashion until the conversation between the customer and the representative is finished.

III. Exemplary Software Application

Figure 3:
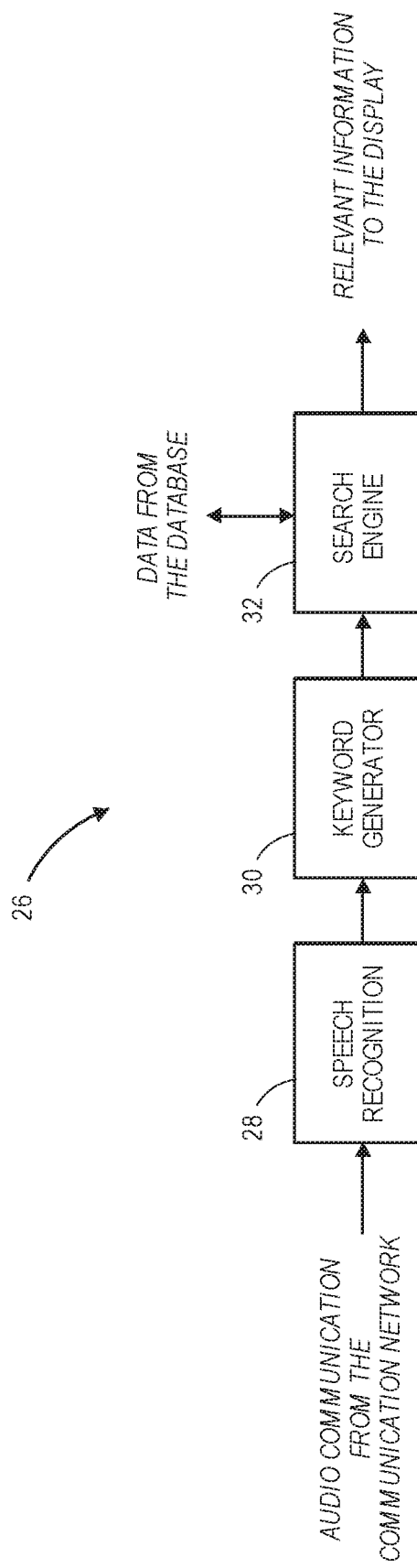
FIG. 3 illustrates various components of an exemplary software application shown in block schematic form configured to present relevant information to a customer service representative of a business.

FIG. 3 illustrates at least a portion of the components of a software application 26 for presenting relevant information to a customer service representative of a business while he is interacting with a customer to discuss products or services of the business. Specifically, the software application 26 is implemented during a phone call between the customer and the representative. The software application 26 is generally executed by the computing device 10 and may broadly comprise a speech recognition component 28, a keyword generator 30, and/or a search engine 32.

The speech recognition component 28 may receive audio communication from the communication network 12. The audio communication may include an electronic signal that is digitized and filtered to create a data stream which corresponds to the conversation between the representative and the customer. The speech recognition component 28 may utilize techniques such as hidden Markov models, dynamic time warping, neural networking, or the like, or combinations thereof in order to convert the data stream to text. The speech recognition component 28 may output a stream of text that represents a transcript of the conversation between the customer and the representative.

The keyword generator 30 receives the text from the speech recognition component 28 and may determine relevant keywords contained therein. The keywords may include customer identification data and/or words that are related to products or services offered by the business. For example, the text may include the customer mentioning his name, such as "John Smith", and the keyword generator 30 may output the words "name: john smith" or words with a similar syntax and format. The text may also include the customer mentioning identification data such as an address, a phone number, an account number, a policy number, or the like. The keyword generator 30 may output the appropriate words and alphanumerics such as "phone number: 123456789" or the like. As another example, during the conversation, the text may include words related to the products of the business. In some embodiments, the keyword generator 30 may compare words, or groups of words, in the text with a list of product-related keywords. The keyword generator 30 may then output those words in the text that match the keywords in the list. For instance, if the business is an insurance company, then the customer and/or the representative may mention words such as "homeowner's policy" or "auto insurance". These words may match keywords in the keyword list, and so the keyword generator 30 may output these words as keywords. In addition or instead, other algorithms or rules may be applied in determining the keywords.

The search engine 32 may receive the keywords from the keyword generator 30 and may compare the keywords with a history, list, or database of keywords (a search history) in the memory element 22 that have been previously searched. If the keywords have already been searched, the search engine 32 may simply wait for the next keywords to be generated from the keyword generator 30. If the keywords have not been previously searched, then the search engine 32 may search the database 18 using the keywords. If any of the customer identification search strings are found in the text, then the search engine 32 may search for those in the database 18. The search results may include the customer's account information or records, such as the types of policies held by the customer along with features of the policies, in the example of the business being an insurance company. The search may also return articles or information windows based upon the requests of the customer. For example, if the customer asks about saving money on their policy, then the search may also return information about insurance discounts. In addition to the search results, the search engine 32 may also provide prompts for the representative to present to the customer, such as asking the customer questions about changes or additions to their policy that would save money. If the customer is a potentially new customer, then the search engine 32 may not search on any of the customer identification search strings. Or, it is possible that the search engine 32 may search the database 18 for the name spoken by the customer and may determine that the name is not in the database 18. Instead or in addition, the search engine 32 may search the database 18 for information regarding whatever product (and/or discount) is mentioned by the customer that matches one or more of the keywords. The results of any search along with any prompts may be communicated to the display 20.

In some embodiments, all of the search results may be communicated to the display 20 to be shown on the screen simultaneously with each result being shown in a separate window. Any prompt may be shown in a separate window as well. For a current customer, the details of each policy along with information and prompts about discounts may be shown in a separate window. For a potentially new customer, information about premium rates may be shown along with information about having multiple policies, relevant requirements or laws, or the like. In other embodiments, a portion of each search result may be shown on the display 20 in a list format, wherein the representative may choose which results he would like to see. The search engine 32 may rank or rate the search results based upon relevance to the keywords. For example, the search engine 32 may assign a percentage match value to each result and may present the percentage value with its associated result. Those results with a higher percentage match may be presented at the top of the list. In addition, the search engine 32 may store the keywords that were just searched in the search history in the memory element 22.

IV. Exemplary Computer-Implemented Method for Presenting Relevant Information to a Customer Service Representative In a first aspect, a computer-implemented method for presenting relevant information to a customer service representative of a business may be provided. The method may include: (1) receiving a digitized data stream corresponding to a spoken conversation between a customer and a representative; (2) converting the data stream to a text stream; (3) determining one or more keywords from the text stream; (4) comparing the one or more keywords with a history of keywords that have previously been searched; and/or (5) searching a database for information related to the one or more keywords that have not been previously searched. The method may include additional, fewer, or alternative actions, including those discussed elsewhere herein.

For instance, the method may include: storing the one or more keywords that were just searched, presenting the information resulting from the search on a display, comparing words from the text stream with words included in a list of keywords related to products or services of the business and generate the words from the text stream that match words from the list of keywords, generating a percentage value corresponding to a relevance to the one or more keywords for each result of the search, presenting a portion of each result of the search along with the percentage value associated with each result on a display, searching the database for an insurance policy of the customer if the one or more keywords include one or more identifiers for the insurance policy, and/or presenting data regarding the insurance policy of the customer on a display.

Exemplary keywords may relate to insurance and financial services, such as "auto," "home," "life," "insurance," or "vehicle loan." For instance, the database may also be searched one or more keywords associated with insurance discounts (and/or premiums), such as discounts (and/or premiums) associated with auto, life, health, home, renters, or personal articles insurance policies, and/or discounts associated with the bundling of one or more insurance products. For instance, words like "bundling," "home," "auto," and "discount" may be identified from the text stream as keywords. After which, data associated with discounts that may be available for customers that purchase auto and home insurance together may be presented for the customer service representative's review on a display screen. Similarly, keywords associated with a home or vehicle loan may be identified, and the database may be keyword searched for home loan or vehicle loan products or services.

V. Exemplary Computing Device for Presenting Relevant Information to a Customer Service Representative of a Business In another aspect, a computing device for presenting relevant information to a customer service representative of a business may be provided. The computing device may include a processing element electronically coupled to a memory element and configured to receive a digitized data stream corresponding to a spoken conversation between a customer and a representative, convert the data stream to a text stream, determine one or more keywords from the text stream, compare the one or more keywords with a history of keywords that have previously been searched, and search a database for information related to the one or more keywords that have not been previously searched. The computing device may include additional, fewer, or alternate components and/or functionality, including that discussed elsewhere herein.

For instance, the processing element may be further configured to: store the one or more keywords that were just searched, present the information resulting from the search on a display, compare words from the text stream with words included in a list of keywords related to products or services of the business and generate the words from the text stream that match words from the list of keywords, generate a percentage value corresponding to a relevance to the one or more keywords for each result of the search, present a portion of each result of the search along with the percentage value associated with each result on a display, search the database for an insurance policy of the customer if the one or more keywords include one or more identifiers for the insurance policy, and/or present data regarding the insurance policy of the customer on a display.

VI. Exemplary Software Application for Presenting Relevant Information to a Customer Service Representative of a Business In yet another aspect, a software application presenting relevant information to a customer service representative of a business may be provided. The software application may comprise a speech recognition component, a keyword generator, and/or a search engine. The speech recognition component may receive a data stream corresponding to a conversation between a representative and a customer, and may be configured to convert the data stream to a text stream of words from the conversation. The keyword generator may receive the text stream, and may be configured to generate one or more keywords from the text stream. The search engine may receive the one or more keywords, and may be configured to compare the one or more keywords with a history of keywords that have previously been searched and search a database for information related to the one or more keywords that have not been previously searched. The software application may include additional, less, or alternate functionality, including that discussed elsewhere herein.

For instance, the keyword generator may be further configured to compare words from the text stream with words included in a list of keywords related to products or services of the business and generate the words from the text stream that match words from the list of keywords. The search engine may be further configured to: generate a percentage value corresponding to a relevance to the one or more keywords for each result of the search, present a portion of each result of the search along with the percentage value associated with each result on a display, search the database for an insurance policy of the customer if the one or more keywords include one or more identifiers for the insurance policy, and/or present data regarding the insurance policy of the customer on a display. The software application components may be computer-readable or computer-executable instructions, computer applications, and/or computer-executable instruction modules stored on non-transitory computer-readable media or medium.

VII. Exemplary Computer-Readable Medium for Presenting Relevant Information to a Customer Service Representative In yet another aspect, a computer-readable medium for presenting relevant information to a customer service representative of a business may be provided. The computer-readable medium may include an executable program stored thereon, wherein the program instructs a processing element of a computing device to perform the following steps: (1) receiving a digitized data stream corresponding to a spoken conversation between a customer and a representative; (2) converting the data stream to a text stream: (3) determining one or more keywords from the text stream; (4) comparing the one or more keywords with a history of keywords that have previously been searched; (5) and/or searching a database for information related to the one or more keywords that have not been previously searched. The program stored on the computer-readable medium may instruct the processing element to perform additional, fewer, or alternative actions, including those discussed elsewhere herein.

For instance, the program may instruct the processing element to: store the one or more keywords that were just searched, present the information resulting from the search on a display, compare words from the text stream with words included in a list of keywords related to products or services of the business and generate the words from the text stream that match words from the list of keywords, generate a percentage value corresponding to a relevance to the one or more keywords for each result of the search, present a portion of each result of the search along with the percentage value associated with each result on a display, search the database for an insurance policy of the customer if the one or more keywords include one or more identifiers for the insurance policy, and/or present data regarding the insurance policy of the customer on a display.

VIII. Exemplary Insurance and Financial Services Applications

In one aspect, voice recognition technology may be used as the basis for semantic searches of Knowledge Articles (and other Knowledge Assets), with a filtering systematically performed to produce a set of "best matches" based upon the customer's choice of words and phrases (during a voice or text conversation). These articles (which may be virtual or computer screen pages of relevant information, or short sentences or portions of text, or even questions to ask customers, that may appear in a pop-up manner) may then be displayed to associates on a display screen without the need to type information into a search field, with rankings based upon full or partial matching of keywords and phrases.

For example, if a customer says, "I'm interested in knowing how I can save money on my Homeowners policy," the program could use that phrase to filter, rank and suggest articles to the associate such as "Deductible Option Pros and Cons," "Discount programs," "Multi-Line Discounts," "Options and Endorsements for HO-W policies," and other such articles (purely hypothetical in this example). Contextual help for particular words may also be populated for an associate when they are recognized (for example, definitions and/or links to policy forms for particular coverages). The "strength" of a given match may also be displayed with the ranking of search results (e.g., 75% match for article #1, 50% match for definition #1, 25% match for article #2).

A further enhancement may be to automatically analyze the keywords and phrases a customer is using against their existing policy information. For example, based upon the phrase above, an analysis may be performed against their existing policy, revealing such things as below-average deductible selections, optional coverages that are not commonly needed in the customer's location (e.g., have low claims activity over last 100 years), or whether the customer is receiving all of the possible discounts related to a given policy (for example, Good Student Discount for youthful drivers). These items may be visually highlighted on a display as suggested word tracks/questions for associates to ask customers (outside of the context of longform Knowledge Articles)—for example, "I see that you have two children on the policy as drivers—have you heard about our Good Student Discount? It doesn't look like that is currently applied to the policy, but usually lowers the premium by X %."

Figure 4:
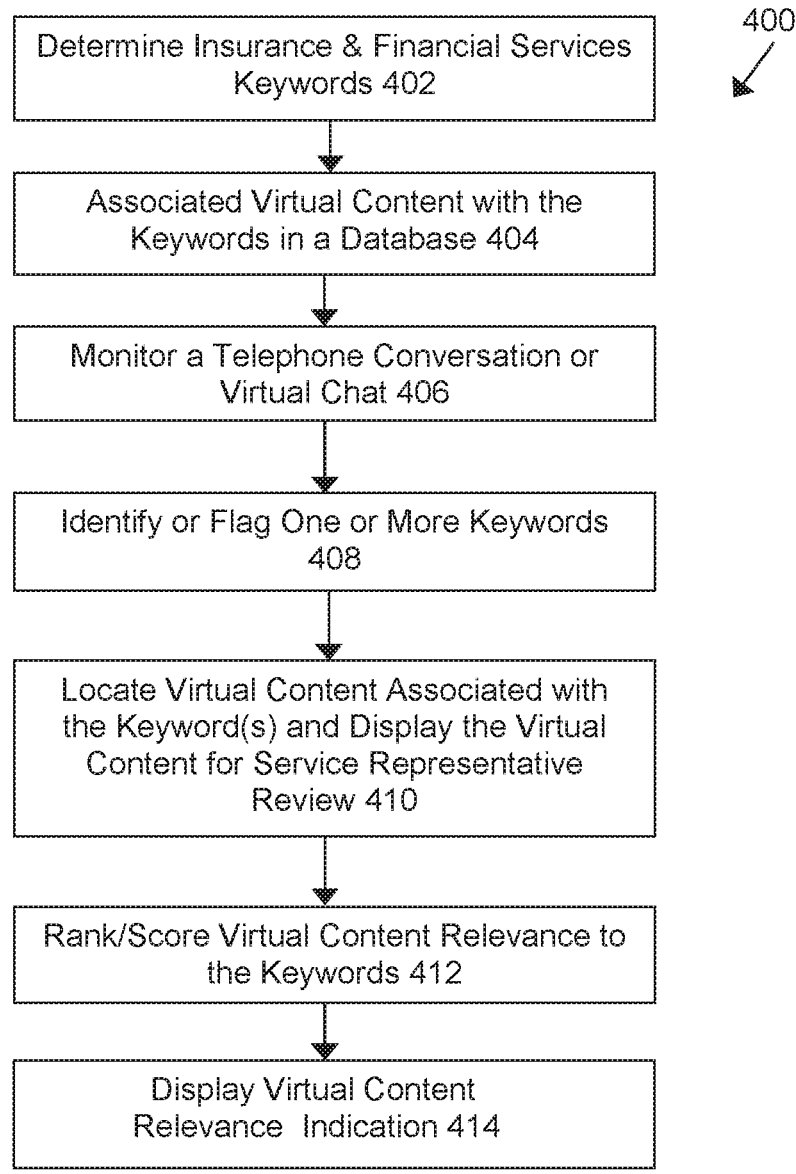
FIG. 4 depicts an exemplary computer-implemented method of enhancing a customer experience and/or displaying relevant information to a customer service representative during a verbal or text conversation with a customer.

FIG. 4 depicts an exemplary computer-implemented method of enhancing a customer experience and/or displaying relevant information to a customer service representative during a verbal or text conversation with a customer 400. The method 400 may include determining insurance-related and/or financial services-related keywords 402; associating virtual content with each of the keywords 404; monitoring a telephone conversation or virtual chat (with the customer's permission or consent) 406; identifying or flagging one or more keywords 408; locating virtual content associated with one or more keywords and displaying the virtual content for service representative review 410; ranking or scoring the virtual content based upon a relevance to the keyword(s) identified 412; and/or display a virtual content relevance (to the keyword(s)) indication for service representative review 414. The method may include additional, less, or alternate actions, including those discussed elsewhere herein, and/or may be implemented via one or more local or remote processors/servers.

The method 400 may include determining insurance-related and/or financial services-related keywords 402. For instance, exemplary insurance-related keywords may include "auto," "home," "apartment," "condo," "life," "health," "renters," "pet," "burial," "personal belongings," "auto insurance," "home insurance," "homeowners insurance," "renters insurance," "pet insurance," "burial insurance," "health insurance," and/or "personal articles insurance," and/or be associated with other types of insurance. Other exemplary insurance-related keywords may include "renewal," "cancellation," "premium," "discount," "rate," "bundle," "bundling," "deductible(s)," "coverage(s)," "limit(s)," "quote," "offers," and/or other terms. Exemplary financial services-related keywords may include "auto loan," "vehicle loan," "home loan," "personal loan," "loan," "financing," "terms," "conditions," "quote," or other terms.

The method 400 may include associating virtual content with each of the keywords 404. For instance, webpages or virtual informational screens may be pre-generated detailing insurance and financial services and/or products, and stored in a database for searching and retrieval via one or more processors. The webpages or virtual informational screens may, for example, include information about auto, home, life, health, renters, pet, burial or other types of insurance. The webpages or virtual informational screens may, for example, include information about vehicle or home loans, or other loan or financial products (such as mutual funds).

In some embodiments, the virtual content may include short sentences or portions of text, and/or questions to ask the customer. The text virtual context, or recommended speech about various products or recommended questions, may appear on the service representatives display screen as pop-up text and/or within a pop-up window in one embodiment.

The method 400 may include monitoring a telephone conversation or virtual chat 406 and then identifying or flagging one or more keywords 408. A processor may monitor a phone call or virtual chat, with the customer's permission or affirmative consent, with a customer and identify one or more insurance or financial services-related keywords. For instance, a processor or computer program may recognize keywords from recorded or live audio/speech and/or recorded or live texting or text messaging. The computer program may recognize one or more keywords in real-time, or substantially real-time, such as by employing speech recognition or voice recognition software (or otherwise employing voice, speech, or text recognition computer-implemented techniques).

The method 400 may include locating virtual content associated with one or more keywords and displaying the virtual content for service representative review 410. A processor or computer program may search a database of virtual content using the keyword(s). For instance, virtual content (such as a webpage, intranet page, or other virtual content displayable on a display screen, such as a computer screen of a customer service representative's computer) may be tagged or associated with a computer searchable data field that includes one or more keywords. As an example, each window, page, portion, or summary of virtual content may be associated with a primary keyword, such as "auto insurance," and one or more secondary keywords, such as "discount," or "bundling." As noted elsewhere herein, the virtual content may be as short as a sentence or a question for the customer, and may appear on a display screen in a pop-up manner—such as "Are you interested in hearing about potential discounts that you may receive if you bundle insurance products?" for keywords associated with bundling or multiple products.

The method 400 may include ranking or scoring the virtual content based upon a relevance to the keyword(s) identified 412. A processor or computer program may rank or score the relevance of the keywords. For instance, keywords of "auto," "home," "life," and/or "bundling" may result in virtual content associated with discounts for bundling insurance products may receive a higher score or rank based upon keywords of "auto" and "discounts."

The method 400 may include displaying a virtual content relevance (to the keyword(s)) indication (such as an icon or color coding) for service representative review 414. Based upon the rank or score achieved, the processor or computer program may generate a ranking or scoring icon for display. The ranking or scoring icon may, for example, be displayed next to a window displaying the virtual content to give a recognizable indication to the service representative of the relevance of the virtual content in relation to the keyword(s) identified. For instance, a green icon may indicate that the virtual content is highly relevant, a yellow icon may indicate that the virtual content is of medium relevance, and a red icon may indicate that the virtual content may or may not be relevant.

IX. Additional Embodiments

In one aspect, a computer-implemented method of enhancing a telephone or online customer experience, and/or display relevant information to a service representative during a conversation with a customer may be provided. The method may include (1) monitoring, recording, and/or analyzing (with the customer's consent), via one or more processors, a conversation (such as a telephone conversation or text/virtual conversation) between a customer and a service representative; (2) identifying, via the one or more processors, one or more keywords spoken or typed by the customer during the conversation, such as by employing speech recognition or voice recognition software (or otherwise employing voice or speech (or text/words) recognition computer-implemented techniques); (3) locating, via the one or more processors, virtual content associated with the one or more keywords, such as by searching a database storing virtual content flagged by keyword; and/or (4) presenting, via the one or more processors, the virtual content associated with the one or more keywords on a display screen associated with the service representative to facilitate the service representative relaying relevant information to the customer during the conversation and/or otherwise enhance the customer experience. The method may include additional, less, or alternate actions, including those discussed elsewhere herein, and/or may be implemented via one or more processors and/or computer-executable instructions stored on non-transitory computer-readable medium or media.

For instance, the method may include (i) identifying, via the one or more processors, virtual content associated with each keyword, such as by scanning or searching virtual pages of information for each keyword; and/or (ii) storing, via the one or more processors, virtual content associated with an individual keyword in a database along with a data field identifying the keyword for subsequent electronic searching for the virtual content by keyword and retrieval.

The method may also include (a) ranking, via the one or more processors, a relevance of virtual content located by keyword, the relevance reflecting how pertinent the virtual content is to the keyword or keywords; and/or (b) displaying, via the one or more processors, virtual content located by keyword that is ranked highest according to relevance on a display first or in a prominent/specific area of a display screen when more than one pieces of virtual content are located so as to not distract the service representative with virtual content that is not the most relevant and/or present only the most relevant information to the service representative. In some embodiments, the virtual content may be a sentence to state to the customer (such as "If you buy auto (or home) insurance, you may be entitled to receive a discount" of a certain amount), and/or a question to ask the customer ("Are you interested in purchasing life insurance?"), and/or may appear on the display in a pop-up manner.

In one aspect, a computer system configured to enhance a telephone or online customer experience, and/or display relevant information to a service representative during a conversation with a customer may be provided. The system may include a processor configured to (1) monitor, record, and/or analyze a conversation (such as a telephone conversation or text/virtual conversation, and with the consent of the customer) between a customer and a service representative, such as by employing speech recognition or voice recognition software (or otherwise employing voice, speech, or text recognition computer-implemented techniques); (2) identify one or more keywords spoken or typed by the customer during the conversation; (3) locate virtual content associated with the one or more keywords, such as by searching a database storing virtual content flagged by keyword, the virtual content being stored in a memory unit; and/or (4) present the virtual content associated with the one or more keywords on a display screen associated with the service representative to facilitate the service representative relaying relevant information to the customer during the conversation and/or otherwise enhance the customer experience. The system and/or processor may be configured to have additional, less, or alternate functionality, including that discussed elsewhere herein.

For instance, the system and/or processor may be configured to (i) identify virtual content associated with each keyword, such as by scanning or searching virtual pages of information for each keyword; and/or (ii) store virtual content associated with an individual keyword in a database or the memory unit along with a data field identifying the keyword for subsequent electronic searching for the virtual content by keyword and retrieval.

The system and/or processor may be further configured to (a) rank a relevance of virtual content located by keyword, the relevance reflecting how pertinent the virtual content is to the keyword or keywords; and/or (b) display virtual content located by keyword that is ranked highest according to relevance on a display first or in a prominent/specific area of a display screen when more than one pieces of virtual content are located so as to not distract the service representative with virtual content that is not the most relevant and/or present only the most relevant information to the service representative.

X. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Although the invention has been described with reference to the embodiments illustrated in the attached drawing figures, it is noted that equivalents may be employed and substitutions made herein without departing from the scope of the invention as recited in the claims.

I claim:

1. A computer-implemented method for presenting relevant information to a customer service representative of a business, the computer-implemented method comprising:
   receiving a digitized data stream corresponding to a spoken conversation between a customer and a representative;
   converting the data stream to a text stream;
   determining one or more keywords from the text stream to be searched in a database;
   if the one or more keywords have not been previously searched in the database, searching the database for an insurance policy of the customer if the one or more keywords include one or more identifiers associated with the insurance policy; and
   presenting information on a display to facilitate relaying relevant information to the customer and enhancing customer experience.

2. The computer-implemented method of claim 1, further comprising storing the one or more keywords that were just searched.

3. The computer-implemented method of claim 1, further comprising comparing the one or more keywords with a history of keywords.

4. The computer-implemented method of claim 1, further comprising comparing words from the text stream with words included in a list of keywords related to products or services of the business and generate the words from the text stream that match words from the list of keywords.

5. The computer-implemented method of claim 1, further comprising generating a percentage value corresponding to a relevance of the one or more keywords.

6. The computer-implemented method of claim 5, further comprising presenting the percentage value on the display.

7. The computer-implemented method of claim 1, further comprising presenting data regarding the insurance policy of the customer on the display.

8. The computer-implemented method of claim 1, wherein the one or more keywords comprise insurance-related keywords including "auto," "home," "apartment," "condo," "life," "health," "renters," "pet," "burial," "personal belongings," "auto insurance," "home insurance," "homeowners insurance," "renters insurance," "pet insurance," "burial insurance," "health insurance," and/or "personal articles insurance".

9. The computer-implemented method of claim 1, wherein the one or more keywords comprise insurance-related keywords including "auto," "home," or "life".

10. The computer-implemented method of claim 1, wherein the one or more keywords comprise insurance-related keywords including "renewal," "cancellation," "premium," "discount," "rate," "bundle," "bundling," "deductible(s)," "coverage(s)," "limit(s)," "quote," and/or "offers".

11. The computer-implemented method of claim 1, wherein the one or more keywords comprise financial services-related keywords including "auto loan," "vehicle loan," "home loan," "personal loan," "loan," "financing," "terms," "conditions," and/or "quote".

12. A computer-implemented method for presenting information during customer service interactions, the computer-implemented method comprising:
   receiving a data stream corresponding to a spoken conversation between a customer and a customer service representative;
   converting the data stream into a text stream;
   analyzing the text stream to determine one or more keywords to be searched in a database;
   if the one or more keywords have not been previously searched in the database, searching the database for an insurance policy of the customer if the one or more keywords include one or more identifiers associated with the insurance policy;
   generating data regarding the insurance policy of the customer; and
   presenting the data regarding the insurance policy of the customer on a display to facilitate enhancement of customer experience between the customer and the customer service representative.

13. The computer-implemented method of claim 12, wherein the one or more keywords comprise insurance-related keywords including "auto," "home," or "life".

14. The computer-implemented method of claim 12, wherein the one or more keywords comprise insurance-related keywords including "renewal," "cancellation," "premium," "discount," "rate," "bundle," "bundling," "deductible(s)," "coverage(s)," "limit(s)," "quote," and/or "offers".

15. The computer-implemented method of claim 12, wherein the one or more keywords comprise financial services-related keywords including "auto loan," "vehicle loan," "home loan," "personal loan," "loan," "financing," "terms," "conditions," and/or "quote".

16. A computing device for presenting relevant information to a customer service representative of a business, the computing device comprising:
   a processing element electronically coupled to a memory element, the processing element configured to:
      receive a digitized data stream corresponding to a spoken conversation between a customer and a representative;
      convert the data stream to a text stream;
      determine one or more keywords from the text stream to be searched in a database;
      if the one or more keywords have not been previously searched in the database, search the database for an insurance policy of the customer if the one or more keywords include one or more identifiers associated with the insurance policy; and
      present information related to the insurance policy on a display to facilitate relaying relevant information to the customer and enhancing customer experience.

17. The computing device of claim 16, wherein the processing element is further configured to store the one or more keywords.

18. The computing device of claim 16, wherein the processing element is further configured to compare words from the text stream with words included in a list of keywords related to products or services of the business.

19. The computing device of claim 16, wherein the processing element is further configured to generate a percentage value corresponding to a relevance of the one or more keywords.

20. The computing device of claim 19, wherein the processing element is further configured to present the percentage value on the display.

\* \* \* \* \*